United States Patent
Lam et al.

(10) Patent No.: US 11,289,897 B1
(45) Date of Patent: Mar. 29, 2022

(54) RADIATION TOLERANT TEMPERATURE COMPENSATED DELAYED UNDERVOLTAGE LOCKOUT AND OVERVOLTAGE SHUTDOWN

(71) Applicant: Crane Electronics, Inc., Lynnwood, WA (US)

(72) Inventors: Cuon Lam, Renton, WA (US); Ryan Ricchiuti, Edmonds, WA (US); Reza Ahmadi, Kirkland, WA (US); Sovann Song, Kent, WA (US)

(73) Assignee: Crane Electronics, Inc., Lynnwood, WA (US)

( * ) Notice: Subject to any disclaimer, the term of this patent is extended or adjusted under 35 U.S.C. 154(b) by 0 days.

(21) Appl. No.: 17/461,814

(22) Filed: Aug. 30, 2021

(51) Int. Cl.
| | |
|---|---|
| G05F 1/569 | (2006.01) |
| G05F 1/575 | (2006.01) |
| G05F 1/567 | (2006.01) |
| G05F 1/571 | (2006.01) |
| H02H 7/12 | (2006.01) |
| G05F 1/56 | (2006.01) |
| H02H 1/00 | (2006.01) |

(52) U.S. Cl.
CPC ............ H02H 7/1213 (2013.01); G05F 1/56 (2013.01); H02H 1/0007 (2013.01); *G05F 1/567* (2013.01); *G05F 1/569* (2013.01); *G05F 1/571* (2013.01); *G05F 1/575* (2013.01)

(58) Field of Classification Search
CPC .......... G05F 1/462; G05F 1/463; G05F 1/567; G05F 1/569; G05F 1/571; G05F 1/575
See application file for complete search history.

(56) References Cited

U.S. PATENT DOCUMENTS

| | | | |
|---|---|---|---|
| 5,708,574 A | * | 1/1998 | Crompton ............... G05F 1/571 323/266 |
| 7,957,113 B2 | | 6/2011 | Yamamoto |
| 9,350,161 B2 | | 5/2016 | Lee et al. |
| 9,979,285 B1 | * | 5/2018 | Lam .......................... H02J 3/18 |
| 10,591,518 B1 | | 3/2020 | Pollak et al. |
| 10,790,818 B1 | | 9/2020 | Frank |
| 10,862,469 B2 | | 12/2020 | Kobayashi et al. |
| 2006/0139825 A1 | * | 6/2006 | Kuo ....................... H03K 17/30 361/56 |

(Continued)

*Primary Examiner* — Gary A Nash
(74) *Attorney, Agent, or Firm* — Seed IP Law Group LLP

(57) ABSTRACT

A circuit includes a voltage detection path having a first transistor and a second transistor coupled to the first voltage detection path by a first terminal of the second transistor. The first voltage detection path includes: a first current source and a first voltage divider unit coupled to the first current source. The first transistor is coupled to the first voltage divider unit by a first terminal of the first transistor. A first voltage value at a second terminal of the first transistor is configured to switch between a first high voltage value and a first low voltage value at least partially based on a first detection voltage value provided at the first terminal of the first transistor by the first voltage divider unit. A second voltage at a second terminal of the second transistor is configured to switch between a second high voltage value and a second low voltage value at least partially based on the first voltage value at the second terminal of the first transistor.

20 Claims, 2 Drawing Sheets

(56) References Cited

U.S. PATENT DOCUMENTS

| | | | | |
|---|---|---|---|---|
| 2008/0074909 | A1* | 3/2008 | Mehta | H02H 7/1213 |
| | | | | 363/52 |
| 2008/0186644 | A1* | 8/2008 | Migliavacca | G05F 1/571 |
| | | | | 361/86 |
| 2011/0127921 | A1* | 6/2011 | Lin | H05B 31/50 |
| | | | | 315/192 |
| 2011/0155700 | A1* | 6/2011 | Xie | B23K 9/1043 |
| | | | | 219/115 |
| 2012/0327544 | A1* | 12/2012 | Peng | H02H 3/20 |
| | | | | 361/91.5 |
| 2014/0146429 | A1 | 5/2014 | Lee et al. | |
| 2015/0381037 | A1* | 12/2015 | Romeo | H02M 3/156 |
| | | | | 323/282 |
| 2016/0139653 | A1* | 5/2016 | Xiong | G06F 1/3296 |
| | | | | 713/323 |

\* cited by examiner

RADIATION TOLERANT TEMPERATURE COMPENSATED DELAYED UNDERVOLTAGE LOCKOUT AND OVERVOLTAGE SHUTDOWN

BACKGROUND

Technical Field

The present disclosure generally relates to voltage control of power drivers.

Description of the Related Art

DC/DC converters are a type of power supply which converts an input DC voltage to a different output DC voltage. Such converters typically include a transformer that is electrically coupled via a switching circuit between a voltage source and a load. Converters known as forward converters include at least one main switch connected between the voltage source and the primary winding of the transformer to provide forward power transfer to the secondary winding of the transformer when the switch is on and conducting.

Voltage monitors are used in a wide variety of voltage sensing applications including DC/DC converters or any circuits that require undervoltage and/or overvoltage detection. These devices offer the circuit designer an economical solution for positive and negative voltage detection. The devices typically include a comparator with an internal voltage reference and an output indicating overvoltage or undervoltage detection. The output is driven to low when the voltage at a sense pin decreases below a negative threshold, and is driven to high when the voltage at the sense pin increases above a positive threshold. The comparator typically includes built-in hysteresis for noise rejection, thereby ensuring stable output operation without false triggering. In some scenarios, the voltage monitor devices include comparator channels that can be configured as either inverting or non-inverting, which enables the undervoltage detection, overvoltage detection or window voltage detection.

Application environments with high levels of ionizing radiation create special design challenges for voltage monitoring. A single charged particle can knock thousands of electrons loose, causing electronic noise and signal spikes. In the case of voltage monitoring circuits, this can cause results which are inaccurate or unintelligible. This can be a particularly serious problem in the design of components for satellites, spacecraft, aircraft, power stations, etc.

BRIEF SUMMARY

A circuit includes an undervoltage detection path and an overvoltage detection path. The undervoltage detection path includes: a first current source; a first voltage divider unit coupled to the first current source; and a first transistor coupled to the first voltage divider unit by a first terminal of the first transistor, a first voltage value at a second terminal of the first transistor configured to switch between a first high voltage value and a first low voltage value at least partially based on a first detection voltage value provided at the first terminal of the first transistor by the first voltage divider unit. The overvoltage detection path includes: a second current source; a second voltage divider unit coupled to the second current source; and a second transistor coupled to the second voltage divider unit by a first terminal of the second transistor, a second voltage value at a second terminal of the second transistor configured to switch between a second high voltage value and a second low voltage value at least partially based on a second detection voltage value provided at the first terminal of the second transistor by the second voltage divider unit, and the second terminal of the second transistor being coupled to the first terminal of the first transistor.

A circuit includes a comparator, a capacitor, and a diode. The comparator includes a first input terminal configured to be coupled to a reference voltage, and a second input terminal coupled to a first terminal of the capacitor. The first terminal of the capacitor is configured to be coupled to a voltage source through a resistance path, and a second terminal of the capacitor is coupled to a ground. A cathode terminal of the diode is configured to be coupled to a voltage signal that switches between a high value and a low value, and an anode terminal of the diode is coupled to the first terminal of the capacitor.

Advantageously, one or more implementations discussed herein monitor voltage through the use of discrete or analog devices and minimal integrated circuits. This provides full control and ownership of the design, and selection of parts that allows for a wide variety of configurations, including configurations that provide various output power ranges and various levels of radiation hardness.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with circuits have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
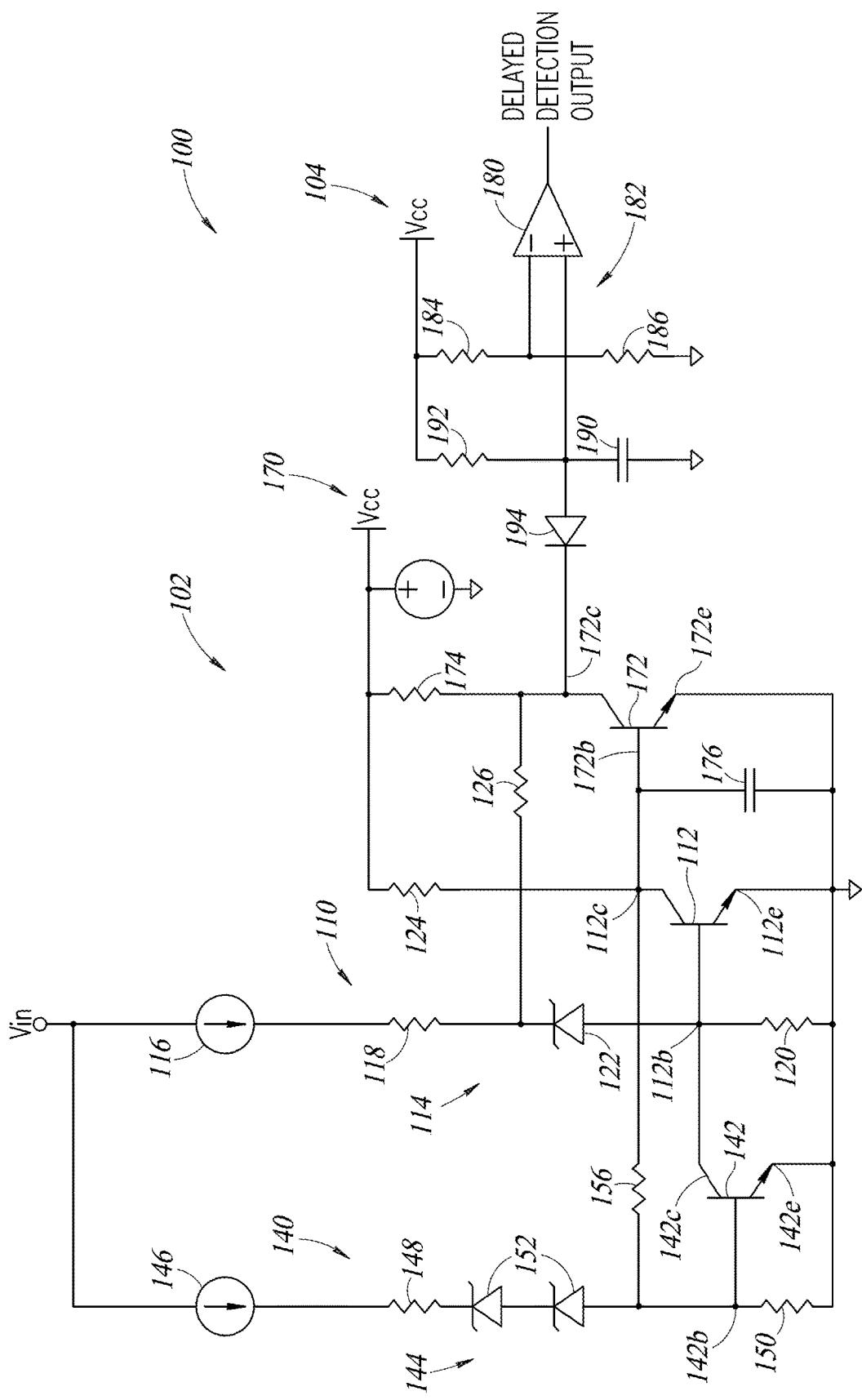
FIG. 1 is an example circuit diagram according to an illustrated implementation.

One or more implementations of the present disclosure provide a voltage monitoring circuit formed using discrete analog components. FIG. 1 shows a schematic diagram for a voltage monitoring circuitry 100 according to example implementations of the present disclosure. In the illustrated implementations, the voltage monitoring circuitry 100 includes a voltage detection stage 102 and an output stage 104.

The voltage detection stage 102 includes an undervoltage detection path 110, an overvoltage detection path 140, and a detection signal generation unit 170.

In one or more implementations, the undervoltage detection path 110 includes a transistor 112, e.g., implemented by an NPN bipolar junction transistor (BJT), which is coupled to a to-be-monitored voltage Vin through a voltage divider unit 114 and a current source unit 116. The voltage divider unit 114 is configured to provide a detection voltage at a base terminal 112b of the NPN BJT 112 that corresponds to the to-be-detected voltage Vin. In some implementations, the voltage divider unit 114 is configured to provide a voltage that is equal to a fraction or a ratio of the to-be-detected voltage Vin at the base terminal 112b of the NPN BJT 112. In some implementations, the voltage divider unit 114 includes a resistor 118 coupled between the base terminal 112b of the NPN BJT 112 and the to-be-detected voltage Vin. The voltage divider unit 114 also includes a resistor 120 coupled between the base terminal 112b of the NPN BJT 112 and a negative voltage source, e.g., a ground. In some implementations, the current source unit 116 is coupled between the voltage divider unit 114 and the to-be-detected voltage Vin, although other implementations are also possible and included in the disclosure. For example, the current source unit 116 may also be coupled between the voltage divider unit 114 and the ground reference.

In some implementations, the voltage divider unit 114 includes one or more Zener diodes 122 (one Zener diode 122 shown for illustration) coupled in series between the base 112b and the resistor 118, with the cathode terminal of the Zener diode 122 coupled to the resistor 118 and the anode coupled to the resistor 120. The Zener diode 122 is configured to establish a relative fixed voltage difference or step, referred to as a Zener voltage, in the voltage divider unit 114.

An emitter terminal 112e of the NPN BJT 112 is coupled to the ground. The collector terminal 112c of the NPN BJT 112 is coupled to a high voltage when the NPN BJT 112 is turned off. When the NPN BJT 112 is turned on, the collector terminal 112c of the NPN BJT 112 is coupled to the ground and is at a low voltage value. The turning on and off of the NPN BJT 112 is controlled by the detection voltage value at the base terminal 112b. That is, a voltage at the collector terminal 112c switches between a high value and a low value based on a voltage value at the base terminal 112b.

In some implementations, the collector 112c is coupled to the detection signal generation unit 170, as described in further details herein.

In some implementations, the parameters of the resistor 118, the resistor 120 and the Zener diode 122 are configured to compensate for the temperature coefficient of the base-emitter voltage (Vbe) of the NPN BJT 112, so that the detection of the undervoltage condition of the to-be-detected voltage Vin will not be affected by the temperature variation. The temperature coefficient of the Zener diode 122 is positive, and the temperature coefficient of the Vbe of the NPN BJT 112 is negative. However, the temperature coefficients of the Zener diode 122 and the Vbe of the NPN BJT 112 may have different magnitudes. Typically, the temperature coefficient of the Zener diode 122 has a greater magnitude than the temperature coefficient of the Vbe of the NPN BJT 112. In some implementations, the parameters of the resistor 118, resistor 120 and the Zener diode 122 are configured based on the following algorithm:

$$Tempco_{Vbe} = \frac{Tempco_{Zener}}{\left(1 + \frac{R_{118}}{R_{120}}\right)}$$

where $Tempco_{Vbe}$ is the temperature coefficient of the Vbe of the NPN BJT 112; $Tempco_{Zener}$ is the temperature coefficient of the Zener diode 122; $R_{118}$ is the resistance value of the resistor 118; and $R_{120}$ is the resistance value of the resistor 120.

In some implementations, the ratio between the resistor 118 and the resistor 120 has some design restrictions because of the design requirements of the voltage divider unit 114. The temperature coefficient of the Zener diode 122 may be adjusted by the selection of one or more Zener diodes of varied Zener voltages. Typically, when the Zener voltage is higher than 5V, the higher the Zener voltage, the higher the temperature coefficient. Various combinations of two or more Zener diodes will provide varied Zener voltage and temperature coefficients. For example, a total Zener voltage of about 12V can be achieved by two Zener diodes each of 6V or by a Zener diode of 3V and a Zener diode of 9V. The two example combinations of Zener diodes will have different temperature coefficients. Thus, although only a single Zener diode 122 is shown in FIG. 1, in practice one or more Zener diodes may be provided to achieve a desired Zener voltage and temperature coefficient.

In one or more implementations, the overvoltage detection path 140 includes a switch 142, e.g., implemented by an NPN bipolar junction transistor (BJT), which is coupled to the to-be-monitored voltage Vin through a voltage supply unit, e.g., a voltage divider unit 144 and a current source unit 146. The voltage divider unit 144 is configured to provide a detection voltage at the base terminal 142b of the NPN BJT 142 that corresponds to the to-be-detected voltage Vin. In some implementations, the voltage divider unit 144 provides a voltage that equals to a fraction or a ratio of the to-be-detected voltage Vin at the base terminal 142b of the NPN BJT 142. In some implementations, the voltage divider unit 144 includes a resistor 148 coupled between the base terminal 142b of the NPN BJT 142 and the to-be-detected voltage Vin. The voltage divider unit 144 also includes a resistor 150 coupled between the base terminal 142b of the NPN BJT 142 and the ground. In some implementations, the current source unit 146 is coupled between the voltage divider unit 144 and the to-be-detected voltage Vin, although other implementations are also possible and included in the disclosure. For example, the current source unit 146 may also be coupled between the voltage divider unit 144 and the ground.

In some implementations, the current sources 116, 146 each may be implemented using discrete components like resistors and bipolar junction transistors.

With respect to a same voltage value of the to-be-detected voltage Vin, e.g., when the overvoltage detection path 140 and the undervoltage detection path 110 are both coupled to a same to-be-detected voltage Vin, the voltage divider unit 144 is configured to provide a smaller detection voltage, e.g., smaller ratio of Vin, to the base terminal 142b of the NPN BJT 142 than the detection voltage provided to the base terminal 112b of the NPN BJT 112 by the voltage divider unit 114. For example, the voltage divider unit 144 is configured to provide a smaller fraction of the to-be-detected voltage Vin at the base terminal 142b than a fraction of the to-be-detected voltage Vin provided at the base terminal 112b by the voltage divider unit 114. In some implementations, resistor 150 has a smaller resistance value than resistor 120, and resistor 148 has a larger resistance value than resistor 118.

In some implementations, the voltage divider unit 144 includes one or more Zener diodes (two are shown) 152 coupled in series between the base terminal 142b and the resistor 148, with the cathode terminal of the top (as shown) Zener diode 152 coupled to the resistor 148. The choice of the parameters of the one or more Zener diodes 152 may consider the Zener voltage and the temperature coefficient of each Zener diodes 152.

The emitter 142e of the NPN BJT 142 is coupled to the ground. The collector terminal 142c of the NPN BJT 142 is coupled to the base terminal 112b of the NPN BJT 112. As such, effectively, the NPN BJT 142 is a switch on the voltage provided to the base terminal 112b of the NPN BJT 112 by the voltage divider unit 114. When the NPN BJT 142 is turned on, the base terminal 112b of the NPN BJT 112 is pulled down to the ground and the voltage divider unit 114 is bypassed and does not provide voltage signal to the base terminal 112b of the NPN BJT 112. When the NPN BJT 142 is turned off, the voltage divider unit 114 provides detection voltage to the base terminal 112b of the NPN BJT 112. As such, the detection voltage on the base terminal 142b of the NPN BJT 142 controls the voltage level at a collector terminal 112c of the NPN BJT 112.

In some implementations, similar to the undervoltage detection path 110, the parameters of the resistor 148, resistor 150, and the Zener diodes 152 are configured to compensate for the temperature coefficient of the Vbe of the NPN BJT 142, The detection signal generation unit 170 includes an NPN BJT 172. A base terminal 172b of the NPN BJT 172 is coupled to the collector terminal 112c of the NPN BJT 112. The base terminal 172b of the NPN BJT 172 is also coupled to a voltage source Vcc through a resistor 174 or a voltage divider unit including resistors 174. An emitter terminal 172e of the NPN BJT 172 is coupled to the ground. As such, effectively, the NPN BJT 112 functions as a switch controlling either the ground voltage value or a high voltage value to be applied to the base terminal 172b of the NPN BJT 172. Specifically, when the NPN BJT 112 is turned on, the ground voltage value is applied to the base terminal 172b of the NPN BJT 172. When the NPN BJT 112 is turned off, a high voltage value is applied to the base terminal 172b of the NPN BJT 172.

In some implementations, the detection signal generation unit 170 includes a capacitor 176 coupled between the base terminal 172b and the ground. The capacitor 176 enables a delayed change in the voltage value applied to the base terminal 172b of the NPN BJT 172, which is controlled by the NPN BJT 112 as a switch, as discussed above. For example, when the NPN BJT 112 is turned on, the capacitor 176 discharges through the NPN BJT 112 to the ground, and the voltage at the base terminal 172b switches from a high value to a low value or ground after a delay. When the NPN BJT 112 is turned off, the capacitor 176 is charged by the voltage source Vcc through the resistor 124. After a delay, the voltage at the base terminal 172b switches from the low value to the high value.

When the voltage at the base terminal 172b of the NPN BJT 112 is at the low level, the NPN BJT 172 is turned off, and the collector terminal 172c of the NPN BJT 112 switches to a high voltage level by the coupling to the voltage source Vcc through the resistor 174. When the voltage at the base terminal 172b of the NPN BJT 112 is at the high level, the NPN BJT 172 is turned on, and the collector terminal 172c of the NPN BJT 112 switches to a low voltage level by coupling to the ground.

In some implementations, the undervoltage detection path 110 and the overvoltage detection path 140 each includes a positive feedback path, respectively. The positive feedback paths reinforce the detection results of the undervoltage detection path 110 and the overvoltage detection path 140, respectively. In some implementations, the positive feedback path of the undervoltage detection path 110 includes a resistor 126 coupled between the collector terminal 172c of the NPN BJT 172 and the base terminal 112b of the NPN BJT 112. In some implementations, the Zener diode 122 is part of the feedback path and is coupled the resistor 126 and the base terminal 112b of the NPN BJT 112, which does not limit the scope of the disclosure. For example, the feedback path resistor 126 may be directly coupled to the base terminal 112b of the NPN BJT 112.

In some implementations, the positive feedback path of the overvoltage detection path 140 includes a resistor 156 coupled between the collector terminal 112c of the NPN BJT 112 and the base terminal 142b of the NPN BJT 142. In some implementations, the feedback path resistor 126 is directly coupled to the base terminal 142b of the NPN BJT 142, which does not limit the scope of the disclosure. For example, one or more of the Zener diodes 152 may be part of the feedback path and may be coupled between the resistor 156 and the base terminal 142b of the NPN BJT 142.

The positive feedback paths reinforce the detection result of the undervoltage detection path 110 and the overvoltage detection path 140, respectively. With respect to the undervoltage detection path 110, when the detection voltage at the base terminal 112b of the NPN BJT 112 is at a low level, the NPN BJT 112 is turned off, and the NPN BJT 172 is turned on. The feedback path resistor 126 is effectively coupled in parallel with the resistor 120 of the voltage divider unit 114, which further decreases the voltage at the base terminal 112b of the NPN BJT 112. When the detection voltage at the base terminal 112b of the NPN BJT 112 is at a high level, the NPN BJT 112 is turned on, and the NPN BJT 172 is turned off. The high voltage level at the collector terminal 172c of the NPN BJT 172 is fed back to the base terminal 112b of the NPN BJT 112 through the feedback path resistor 126, which further increases the voltage at the base terminal 112b of the NPN BJT 112.

With respect to the overvoltage detection path 140, when the detection voltage at the base terminal 142b of the NPN BJT 142 is at a low level, the NPN BJT 142 is turned off, and the NPN BJT 112 is turned on. The feedback path resistor 156 is effectively coupled in parallel with the resistor 150 of the voltage divider unit 144, which further decreases the voltage at the base terminal 142b of the NPN BJT 142. When the detection voltage at the base terminal 142b of the NPN BJT 142 is at a high level, the NPN BJT 142 is turned on, and the NPN BJT 112 is turned off. The high voltage level at the collector terminal 112c of the NPN BJT 112 is fed back to the base terminal 142b of the NPN BJT 112 through the feedback path resistor 156, which further increases the voltage at the base terminal 142b of the NPN BJT 142.

In some implementations, the collector terminal 172c of the NPN BJT 172 is configured as an output terminal of the detection signal generation unit 170 and is coupled to the output stage 104.

The output stage 104 includes a comparator 180 having a first differential input terminal, e.g., a positive or non-inverting input terminal, and a second differential input terminal, e.g., a negative or inverting input terminal. The negative input terminal of the comparator 180 is coupled to a reference voltage. In some implementations, the reference voltage is provided by a voltage divider unit 182 coupled to a voltage source Vcc. The voltage divider unit 182 includes a resistor 184 coupled between the negative input terminal of the comparator 180 and the voltage source Vcc, and a resistor 186 coupled between the negative input terminal of the comparator 180 and a ground. A capacitor 190 is coupled to the positive input of the comparator 180 and a ground. A first terminal of the capacitor is coupled to the positive input of the comparator 180 and to the voltage source Vcc through a resistor 192. A second terminal of the capacitor 190 is coupled to a ground.

The first terminal of the capacitor 190 is coupled to the output terminal of the detection signal generation unit 170, e.g., the collector terminal 172c of the NPN BJT 172, through a diode 194. Specifically, the cathode of the diode 194 is coupled to the collector terminal 172c of the NPN BJT 172 and the anode of the diode 194 is coupled to the first terminal of the capacitor 190.

Figure 2:
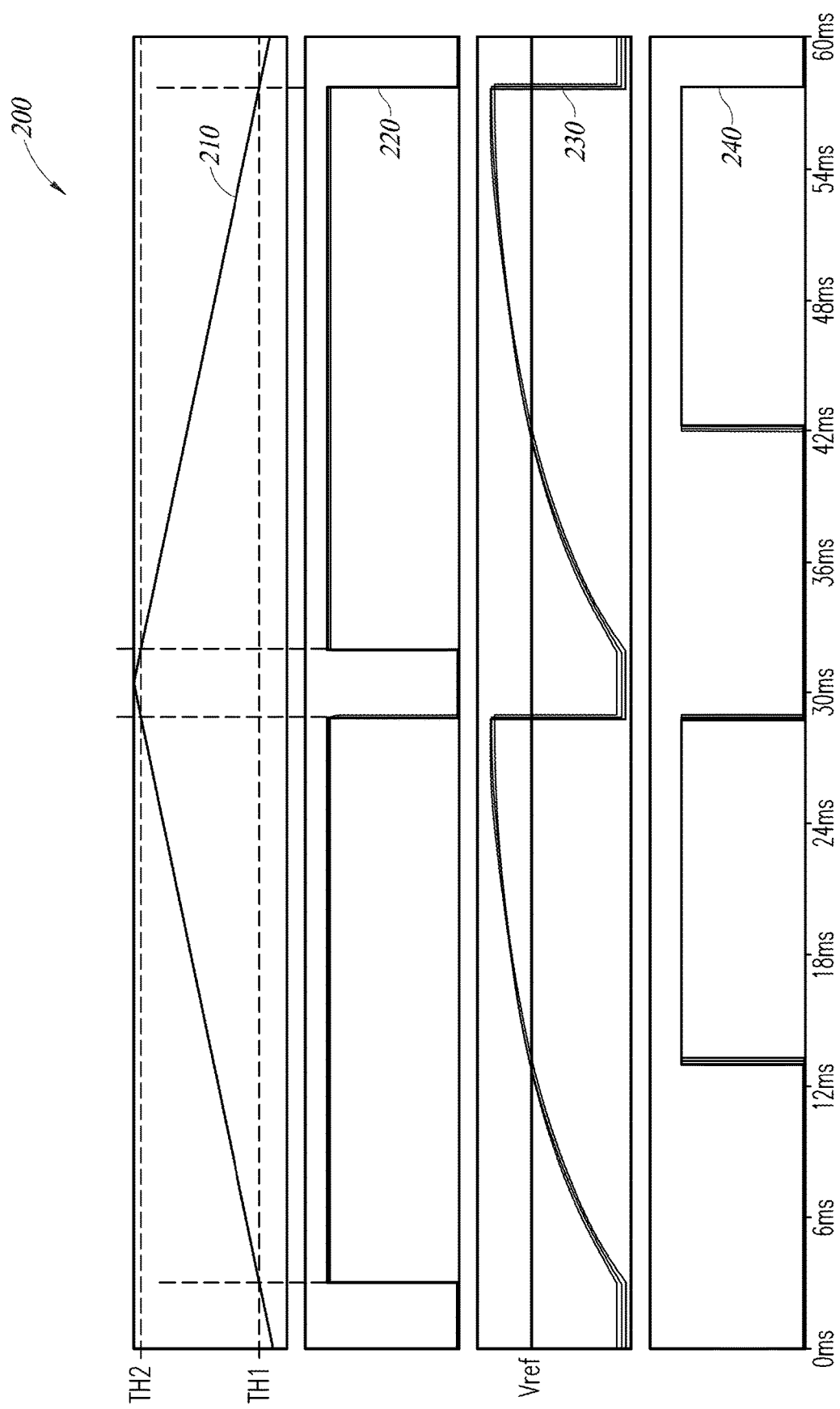
FIG. 2 shows example signal waveforms according to some illustrated operations of the example circuit of FIG. 1.

In operation, when the output terminal of the detection signal generation unit 170 (i.e., the collector terminal 172c) is at a high value, the capacitor 190 is charged by the voltage source Vcc through the resistor 192. After a delay configured based on the RC time constant of the resistor 192 and the capacitor 190, the capacitor 190 is charged to a voltage that is higher than the reference voltage at the negative input terminal of the comparator 180, which switches the output of the comparator 180 to a first output value. When the output terminal of the detection signal generation unit 170 is at a low value, the capacitor 190 is discharged quickly through the diode 194, e.g., because the resistance value of the diode 194 is very low. With very little delay, the voltage value at the first terminal of the capacitor, i.e., the voltage at the positive input terminal of the comparator 180, becomes lower than the reference voltage at the negative input terminal of the comparator 180, which switches the output of the comparator 180 to a second output value. FIG. 2 shows a chart 200 of signal waveforms of the to-be-detected voltage Vin, the output of the detection signal generation unit 170, the voltage of the capacitor 190, and the output of the output stage 104.

Referring to FIGS. 1 and 2 together, in operation, when the voltage value of the to-be-detected voltage Vin 210 is lower than a first threshold level TH1, e.g., the undervoltage level, the detection voltage at the base terminal 112b of the NPN BJT 112 is lower than the Vbe of the NPN BJT 112, the NPN BJT 112 turns off, and the voltage at the collector terminal 112c of the NPN BJT 112 switches to a high value, for example, by coupling to the voltage source Vcc through the resistive voltage divider formed by resistors 124, 156 and 150.

With the high voltage value at the collector terminal 112c, which is coupled to the base terminal 172b of the NPN BJT 172, the NPN BJT 172 is turned on, and the voltage 220 at the collector terminal 172c of the NPN BJT 172 is pulled down to the low value, e.g., the ground value. The low voltage value at the collector terminal 172c is fed back through the resistor 126 to further pull down the voltage at the base terminal 112b of the NPN BJT 112, which reinforces the change in the state. For example, resistor 126 is effectively coupled in parallel to the Zener diode 122 and the resistor 120, which further decreases the voltage at the cathode terminal of the Zener diode 122. That is, resistor 126 forms a positive feedback loop.

With the low value of the voltage 220 at the collector terminal 172c of the NPN BJT 172, i.e., low voltage value at the output of the detection signal generation unit 170, the capacitor 190 is discharged and the voltage 230 of the capacitor 190 is at a low value. The output 240 of the comparator 180 is at a low value as a first output, indicating that either an undervoltage condition or an overvoltage condition is detected for the to-be-detected voltage Vin.

When the voltage value of the to-be-detected voltage Vin increases above the first threshold level TH1, the voltage at the base terminal 112b of the NPN BJT 112 increases to be higher than the Vbe of the NPN BJT 112, and the NPN BJT 112 turns on. The voltage at the collector terminal 112c of the NPN BJT 112 is pulled down to low value, for example, the ground value.

With the low voltage value at the collector terminal 112c, the NPN BJT 172 is turned off, and the voltage 220 at the collector terminal 172c of the NPN BJT 172 switches to a high value, for example, by coupling to the voltage source Vcc through a resistive voltage divider formed by resistors 174, 126, and 120. The high voltage value at the collector terminal 172c is fed back through the resistor 126 to further pull up or reinforce the high voltage at the base terminal 112b of the NPN BJT 112, which reinforces the change in the state. That is, the resistor 126 forms a positive feedback loop.

With the high value of the voltage 220 at the collector terminal 172c of the NPN BJT 172, the capacitor 190 starts to be charged and the voltage 230 of the capacitor 190 increase with a slope configured by the RC time constant in charging the capacitor 190 through the resistor 192. When the voltage 230 is higher than the reference voltage Vref at the negative input of the comparator 180, the output 240 of the comparator 180 switches to a high value as a second output, indicating that the voltage value of the to-be-detected voltage Vin is at a normal operation stage. The delayed switch to the second output value of the output 240 ensures a smooth turn on of the related system, e.g., a power converter, when the to-be-detected voltage Vin changes from an abnormal condition to a normal condition. The delay can be adjusted by adjusting the parameters of one or more of the capacitor 190 or the resistor 192 to adjust the RC time constant in charging the capacitor 190.

Because of the different voltage dividing setup, the detection voltage value at the base terminal 142b of the NPN BJT 142 is smaller than the detection voltage at the base terminal 112b of the NPN BJT 112. Depending on the parameters of the NPN BJT 112 and NPN BJT 142, there is a normal range of voltage values of the sensed voltage Vin, under which the detection voltage at the base terminal 112b is greater than the Vbe of the NPN BJT 112 and the detection voltage at the base terminal 142b of the NPN BJT 142 is smaller than the Vbe of the NPN BJT 142. That is, the NPN BJT 112 is turned on and the NPN BJT 142 is turned off. In some implementations, the NPN BJT 112 and the NPN BJT 142 are identical to one another in parameters.

When the voltage 210 value at the to-be-detected voltage Vin further increases to a second threshold level TH2, the voltage at the base terminal 142b of the NPN BJT 142 increases to be higher than the Vbe of the NPN BJT 142, the NPN BJT 142 turns on and the voltage at the collector terminal 142c of the NPN BJT 142 is pulled down to low value, for example, the ground value.

With the low voltage value at the collector terminal 142c, which is coupled to the base terminal 112b of the NPN BJT 112, the NPN BJT 112 is turned off, and the voltage at the collector terminal 112c of the NPN BJT 112 switches to a high value.

The high voltage value at the collector terminal 112c is fed back to the base terminal 142b of the NPN BJT 142 through the resistor 156 to further pull up or reinforce the high voltage value at the base terminal 142b of the NPN BJT 142. That is, the resistor 156 forms a positive feedback.

With the high voltage value at the collector terminal 112c, which is coupled to the base terminal 172b of the NPN BJT 172, the NPN BJT 172 is turned on, and the voltage 220 at the collector terminal 172c of the NPN BJT 172 is pulled down to the low value, e.g., the ground value. The low voltage value at the collector terminal 172c is fed back through the resistor 126 to further pull down the voltage at the base terminal 112b of the NPN BJT 112, which reinforces the change in the state.

With the low value of the voltage 220 at the collector terminal 172c of the NPN BJT 172, the capacitor 190 discharges quickly through the diode 194, and the voltage 230 of the capacitor 190 switches to a low value. The output 240 of the comparator 180 switches to a low value, i.e., the first output, indicating that either an undervoltage condition or an overvoltage condition is detected for the to-be-detected voltage Vin.

When the voltage 210 value at the to-be-detected voltage Vin decreases to a value that is lower than the second threshold TH2 and is higher than the first threshold TH1, i.e., the to-be-detected voltage Vin is in the normal operation condition, the NPN BJT 142 is turned off, the NPN BJT 112 is turned on, and the NPN BJT 172 is turned off. The capacitor 190 is charged. When the capacitor 190 is charged to have a voltage greater than the reference voltage Vref, with a delay after the voltage 210 value at the to-be-detected voltage Vin has decreased to be within the normal range, the output of the comparator 180 switches to the second output, indicating that a system can be turned on.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers, as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A circuit, comprising:
a first voltage detection path having a first transistor; and
a second transistor coupled to the first voltage detection path by a first terminal of the second transistor;
wherein the first voltage detection path includes:
a first current source; and
a first voltage divider unit coupled to the first current source, the first transistor coupled to the first voltage divider unit by a first terminal of the first transistor, a first voltage value at a second terminal of the first transistor configured to switch between a first high voltage value and a first low voltage value at least partially based on a first detection voltage value provided at the first terminal of the first transistor by the first voltage divider unit,
wherein a second voltage at a second terminal of the second transistor is configured to switch between a second high voltage value and a second low voltage value at least partially based on the first voltage value at the second terminal of the first transistor.

2. The circuit of claim 1, wherein the first voltage divider unit includes a Zener diode, an anode terminal of the Zener diode coupled to the first terminal of the first transistor.

3. The circuit of claim 2, wherein the first voltage divider unit includes a first resistor and a second resistor, the first resistor coupled between the first terminal of the first transistor and a ground, and the Zener diode coupled in series between the second resistor and the first terminal of the first transistor.

4. The circuit of claim 3, wherein the first transistor is an NPN bipolar junction transistor having a first Vbe with a first temperature coefficient, and the Zener diode has a second temperature coefficient, and wherein:

$$Tempco_{Vbe} = \frac{Tempco_{Zener}}{\left(1 + \frac{R_2}{R_1}\right)}$$

where $Tempco_{Vbe}$ denotes the first temperature coefficient of the first Vbe, $Tempco_{Zener}$ denotes the second temperature coefficient of the Zener diode, $R_1$ denotes a resistance of the first resistor, and $R_2$ denotes a resistance of the second resistor.

5. The circuit of claim 1, wherein the first voltage detection path is coupled to a to-be-detected voltage.

6. The circuit of claim 1, comprising a feedback path between the second terminal of the second transistor and the first terminal of the first transistor.

7. The circuit of claim 6, wherein the feedback path includes a third resistor.

8. The circuit of claim 1, comprising an output stage, the output stage including a comparator, a capacitor, and a diode, wherein:
   the comparator includes a first input terminal configured to be coupled to a reference voltage, and a second input terminal coupled to a first terminal of the capacitor;
   a cathode terminal of the diode is coupled to the second terminal of the second transistor, and an anode terminal of the diode is coupled to the first terminal of the capacitor; and
   the first terminal of the capacitor is configured to be coupled to a voltage source through a resistance path.

9. The circuit of claim 1, comprising a second voltage detection path, the second voltage detection path including:
   a second current source;
   a second voltage divider unit coupled to the second current source; and
   a third transistor coupled to the second voltage divider unit by a first terminal of the third transistor, a third voltage value at a second terminal of the third transistor configured to switch between a third high voltage value and a third low voltage value at least partially based on a second detection voltage value provided at the first terminal of the third transistor by the second voltage divider unit,
   wherein the second terminal of the third transistor is coupled to the first terminal of the first transistor.

10. The circuit of claim 9, wherein in response to the first voltage detection path and the second voltage detection path being coupled to a same to-be-detected voltage, the second detection voltage value is smaller than the first detection voltage value.

11. The circuit of claim 9, comprising a feedback path coupled between the second terminal of the first transistor and the first terminal of the third transistor.

12. A circuit, comprising:
   an undervoltage detection path; and
   an overvoltage detection path,
   wherein the undervoltage detection path includes:
      a first current source;
      a first voltage divider unit coupled to the first current source; and
      a first transistor coupled to the first voltage divider unit by a first terminal of the first transistor, a first voltage value at a second terminal of the first transistor configured to switch between a first high voltage value and a first low voltage value at least partially based on a first detection voltage value provided at the first terminal of the first transistor by the first voltage divider unit, and
   wherein the overvoltage detection path includes:
      a second current source;
      a second voltage divider unit coupled to the second current source; and
      a second transistor coupled to the second voltage divider unit by a first terminal of the second transistor, a second voltage value at a second terminal of the second transistor configured to switch between a second high voltage value and a second low voltage value at least partially based on a second detection voltage value provided at the first terminal of the second transistor by the second voltage divider unit, and the second terminal of the second transistor being coupled to the first terminal of the first transistor.

13. The circuit of claim 12, wherein the undervoltage detection path and the overvoltage detection path are each coupled to a same to-be-detected voltage, the first detection voltage value equaling a first ratio of the to-be-detected voltage, the second detection voltage value equaling a second ratio of the to-be-detected voltage, and the first ratio is greater than the second ratio.

14. The circuit of claim 12, wherein the first voltage divider unit includes a Zener diode, an anode terminal of the Zener diode coupled to the first terminal of the first transistor.

15. The circuit of claim 14, wherein the first voltage divider unit includes a first resistor and a second resistor, the first resistor coupled between the first terminal of the first transistor and a ground, and the Zener diode coupled in series between the second resistor and the first terminal of the first transistor.

16. The circuit of claim 15, wherein the first transistor is an NPN bipolar junction transistor having a first Vbe with a first temperature coefficient, and the Zener diode has a second temperature coefficient, and wherein:

$$Tempco_{Vbe} = \frac{Tempco_{Zener}}{\left(1 + \frac{R_2}{R_1}\right)}$$

where $Tempco_{Vbe}$ denotes the first temperature coefficient of the first Vbe, $Tempco_{Zener}$ denotes the second temperature coefficient of the Zener diode, $R_1$ denotes a resistance of the first resistor, and $R_2$ denotes a resistance of the second resistor.

17. The circuit of claim 12, comprising a feedback path between the second terminal of the first transistor and the first terminal of the second transistor.

18. The circuit of claim 12, comprising a third transistor, a first terminal of the third transistor coupled to the second terminal of the first transistor,
   wherein a third voltage at a second terminal of the third transistor is configured to switch between a third high voltage value and a third low voltage value at least partially based on the first voltage value at the second terminal of the first transistor.

19. The circuit of claim 18, comprising an output stage, the output stage including a comparator, a capacitor, and a diode, wherein:

the comparator includes a first input terminal configured to be coupled to a reference voltage, and a second input terminal coupled to a first terminal of the capacitor;

a cathode terminal of the diode is coupled to the second terminal of the third transistor, and an anode terminal of the diode is coupled to the first terminal of the capacitor; and the first terminal of the capacitor is configured to be coupled to a voltage source through a resistance path.

20. A circuit, comprising a comparator, a capacitor, and a diode, wherein:

the comparator includes a first input terminal configured to be coupled to a reference voltage, and a second input terminal coupled to a first terminal of the capacitor;

the first terminal of the capacitor is configured to be coupled to a voltage source through a resistance path, and a second terminal of the capacitor is coupled to a ground; and a cathode terminal of the diode is configured to be coupled to a voltage signal that switches between a high value and a low value, and an anode terminal of the diode is coupled to the first terminal of the capacitor.

* * * * *